(12) United States Patent
Louis et al.

(10) Patent No.: US 12,145,312 B2
(45) Date of Patent: Nov. 19, 2024

(54) ADDITIVE MANUFACTURING METHOD FOR MAKING A THREE-DIMENSIONAL OBJECT USING SELECTIVE LASER SINTERING

(71) Applicant: SOLVAY SPECIALTY POLYMERS USA, LLC, Alpharetta, GA (US)

(72) Inventors: Chantal Louis, Alpharetta, GA (US); Christopher Ward, Sandy Springs, GA (US); Craig Swanson, Roswell, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 377 days.

(21) Appl. No.: 17/292,764

(22) PCT Filed: Nov. 12, 2019

(86) PCT No.: PCT/EP2019/081082
§ 371 (c)(1),
(2) Date: May 11, 2021

(87) PCT Pub. No.: WO2020/099444
PCT Pub. Date: May 22, 2020

(65) Prior Publication Data
US 2021/0394438 A1    Dec. 23, 2021

Related U.S. Application Data

(60) Provisional application No. 62/760,271, filed on Nov. 13, 2018.

(30) Foreign Application Priority Data

Jan. 15, 2019   (EP) .................................. 19151955

(51) Int. Cl.
| | |
|---|---|
| B29C 64/153 | (2017.01) |
| B29K 71/00 | (2006.01) |
| B29K 105/00 | (2006.01) |
| B29K 105/26 | (2006.01) |
| B33Y 10/00 | (2015.01) |
| B33Y 70/00 | (2020.01) |
| C08G 65/40 | (2006.01) |
| C08J 11/16 | (2006.01) |
| C09D 5/03 | (2006.01) |
| C09D 171/00 | (2006.01) |

(52) U.S. Cl.
CPC ............ *B29C 64/153* (2017.08); *B33Y 70/00* (2014.12); *C08G 65/4012* (2013.01); *C08J 11/16* (2013.01); *C09D 5/031* (2013.01); *C09D 171/00* (2013.01); *B29K 2071/00* (2013.01); *B29K 2105/0094* (2013.01); *B29K 2105/26* (2013.01); *B33Y 10/00* (2014.12); *C08J 2371/10* (2013.01)

(58) Field of Classification Search
CPC .. C08G 65/4012; C08J 11/16; B29K 2071/00; C08K 3/32; C08L 71/10
See application file for complete search history.

(56) References Cited

U.S. PATENT DOCUMENTS

| | | | |
|---|---|---|---|
| 5,250,738 A | 10/1993 | Hackenbruch et al. | |
| 5,300,693 A | 4/1994 | Gilb et al. | |
| 2006/0134419 A1* | 6/2006 | Monsheimer | C08K 5/0066 528/125 |
| 2012/0329932 A1* | 12/2012 | Mathieu | C08K 3/38 264/603 |
| 2013/0217838 A1* | 8/2013 | DeFelice | B33Y 10/00 528/125 |
| 2018/0208741 A1* | 7/2018 | Le | C08G 65/40 |
| 2020/0164546 A1* | 5/2020 | Pedicini | B29B 13/02 |

FOREIGN PATENT DOCUMENTS

| | | |
|---|---|---|
| CN | 108606860 A | 10/2018 |
| WO | 2013085947 A1 | 6/2013 |
| WO | 2018115033 A1 | 6/2018 |
| WO | 2019002620 A1 | 1/2019 |

OTHER PUBLICATIONS

Wikipedia (search for "polyetherketoneketone" published in public at least on Jul. 2, 2017, available at https://en.wikipedia.org/w/index.php?title=Polyetherketoneketone&oldid=788672668) (Year: 2017).*
Astm D3850-12—Standard Test Method for Rapid Thermal Degradation of Solid Electrical Insulating Materials by Thermogravimetric Method (TGA), 2012, p. 1-4.
Standard ASTM D1238-04, "Standard Test Method for Melt Flow Rates of Thermoplastics by Extrusion Plastometer", 2004, p. 1-13.
ASTM D3418-08—Standard Test Method for Transition Temperatures and Enthalpies of Fusion and Crystallization of Polymers by Differential Scanning Calorimetry, 2008, p. 1-7.
ISO 9277-2010—Standard Determination of the specific surface area of solids by gas adsorption—BET method, 2010, p. 1-24.

* cited by examiner

*Primary Examiner* — Timothy Kennedy
*Assistant Examiner* — Inja Song
(74) *Attorney, Agent, or Firm* — Osha Bergman Watanabe & Burton LLP

(57) ABSTRACT

The present disclosure relates to an additive manufacturing (AM) method for making a three-dimensional (3D) object, comprising a) depositing successive layers of a powdered material (M), at least partially recycled, comprising at least one poly(ether ketone ketone) (PEKK), having a phosphorus content of more than 30 ppm, as measured by Inductively Coupled Plasma Optical Emission Spectrometry (ICP-OES), and b) selectively sintering each layer prior to deposition of the subsequent layer.

10 Claims, No Drawings

ADDITIVE MANUFACTURING METHOD FOR MAKING A THREE-DIMENSIONAL OBJECT USING SELECTIVE LASER SINTERING

RELATED APPLICATION

This application is a U.S. national stage entry under 35 U.S.C. § 371 of international patent application No. PCT/EP2019/081082 filed on Nov. 12, 2019, which claims priority to U.S. provisional patent application No. 62/760,271, filed on Nov. 13, 2018, and European patent application No. 19151955.2, filed on Jan. 15, 2019, the whole content of each of these applications being explicitly incorporated herein by reference.

TECHNICAL FIELD

The present disclosure relates to an additive manufacturing (AM) method for making a three-dimensional (3D) object, using a powdered polymer material (M), at least partially recycled, comprising at least one poly(ether ketone ketone) (PEKK) polymer, in particular to a 3D object obtainable by laser sintering from this powdered polymer material (M).

BACKGROUND ART

Additive manufacturing systems are used to print or otherwise build 3D objects from a digital blueprint created with computer-aided design (CAD) modelling software. Selective laser sintering ("SLS"), one of the available additive manufacturing techniques, uses electromagnetic radiation from a laser to fuse powdered materials into a mass. The laser selectively fuses the powdered material by scanning cross-sections generated from the digital blueprint of the object on the surface of a powder bed. After a cross-section is scanned, the powder bed is lowered by one layer thickness, a new layer of material is applied, and the bed is rescanned. Locally full coalescence of polymer particles in the top powder layer is necessary as well as an adhesion with previous sintered layers. This process is repeated until the object is completed.

In the powder bed of the SLS printer, the powdered material is generally preheated to a processing temperature close to the melting point (Tm) of the resin. For semi-crystalline polymers, crystallization (Tc) should be inhibited during printing as long as possible, at least for several sintered layers. The processing temperature must therefore be precisely adjusted between the melting temperature (Tm) and the crystallization temperature (Tc) of the semi crystalline polymer, also called the "sintering window". The preheating of the powder makes it easier for the laser to raise the temperature of the selected regions of layer of unfused powder to the melting point. The laser causes fusion of the powder only in locations specified by the input. Laser energy exposure is typically selected based on the polymer in use and to avoid polymer degradation.

When the process is completed, the non-fused powder is removed from the 3D object and can be recycled and reused in a subsequent SLS process.

Producing an article by laser sintering can take a long time, more than 16 hours for certain articles or parts. This means that the powder material is submitted to high temperatures in the powder bed of the SLS printer for an extended period of time (called thermal aging). This can irreversibly affect the polymer material, in such a way that it is not recyclable anymore. Not only the chemical nature of the polymer is changed due to thermal aging, but also its mechanical properties of the polymer material such as its toughness. For some semi-crystalline polymers, such as poly(ether ketone ketone) (PEKK), the processing temperature is too high, causing degradation and/or crosslinking, which negatively affect SLS processability and recycling. The potential of the SLS process is therefore limited by the restricted number of materials optimised for the process.

WO 2019/002620 A1 (Solvay Specialty Polymers USA) relates to a PEKK polymer powder, having a $d_{0.9}$-value less than 150 µm, wherein the PEKK polymer has a Td(1%) of at least 500° C., as well as to the use of such powder in a in a method for manufacturing a 3D object.

WO 2013/085947 (Oxford Performance Materials) relates to a process for manufacturing a three-dimensional object from a powder by selective sintering the powder using electromagnetic radiation, wherein the powder comprises recycled PAEK, for example recycled PEKK. The inventors have performed several experiments and demonstrate that only certain PEKK polymer can, in fact, by recycled into a new 3D printing process cycle.

CN 108686860 A relates to personalized 3D printing interbody fusion cages and preparation method thereof. According to example 2, a blend of PEKK and magnesium phosphate was used to prepare a lumbar fusion cage using a selective laser sintering method. The inventors demonstrate that such blend exhibits poor mechanical properties and no flow at all after heat aging.

SUMMARY OF INVENTION

The present invention relates to an additive manufacturing (AM) method for making a three-dimensional (3D) object. The method comprises the steps of: a) depositing successive layers of a powdered material (M), at least partially recycled, comprising at least one poly(ether ketone ketone) (PEKK), having a phosphorus content of more than 30 ppm, preferably 50 ppm, more preferably 100 ppm, as measured by Inductively Coupled Plasma Optical Emission Spectrometry (ICP-OES), and b) selectively sintering each layer prior to deposition of the subsequent layer.

The 3D objects or articles obtainable by such method of manufacture can be used in a variety of final applications. Mention can be made in particular of implantable device, medical device, dental prostheses, brackets and complex shaped parts in the aerospace industry and under-the-hood parts in the automotive industry.

DISCLOSURE OF THE INVENTION

The present invention relates to an additive manufacturing (AM) method for making a three-dimensional (3D) object. The method comprises a first step of depositing successive layers of a powdered polymer material (M), at least partially recycled, comprising at least one poly(ether ketone ketone) (PEKK) polymer. The method of the invention also comprises a step of selectively sintering each layer prior to deposition of the subsequent layer.

The method for manufacturing a 3D object of the present invention employs a powdered polymer material (M), at least partially recycled, comprising a PEKK polymer as the main element of the polymeric material. The powdered polymer material (M) can have a regular shape such as a spherical shape, or a complex shape obtained by grinding/milling of pellets or coarse powder.

By "at least partially recycled", it should be understood that the powdered polymer material (M) comprises recycled powdered material, that-is-to say a material which has already been exposed to the processing temperature of a 3D printer. In some embodiments, the powdered polymer material (M) comprises at least 10 wt. % of recycled powdered material, based on the total weight of the material (M), at least 20 wt. %, at least 30 wt. %, at least 40 wt. %, at least 50 wt. %, at least 60 wt. %, at least 70 wt. %, at least 80 wt. %, at least 90 wt. %, at least 95 wt. % or at least 98 wt. %. The processing temperature of the printer is the temperature at which is heated the material (M) prior to the sintering, for example in the powder bed of a SLS printer.

According to the present invention, the PEEK has a phosphorus content of more than 30 ppm, as measured by Inductively Coupled Plasma Optical Emission Spectrometry (ICP-OES). It was surprisingly discovered that a powder material comprising PEKK polymer presenting such a phosphorus content, makes possible the recycling of the unsintered material and its reuse in the manufacture of a new 3D object. The inventors demonstrate that when the PEKK polymer has a phosphorus content of more than 30 ppm, it keeps a set of properties which make it reusable in a new SLS 3D printing cycle without irreversibly affecting its flowability or Melt Flow Index (MFI as measured according to ASTM D1238 at 340° C. with a 8.4 kg weight), as well as without affecting the final properties of the printed articles, which is not the case of the PEKK powder material of the prior art. WO 2013/085947 (Oxford Performance Materials) describes the use of recycled PAEK, for example recycled PEKK. In this document, the elongation at break of the printed parts decreases over PEKK recycles and the printer bed temperature needs to be increased to maintain the printing conditions (from 285° C. to 300° C.). The inventors have performed several experiments and demonstrate that only certain PEKK polymer can in fact by effectively recycled into a new 3D printing process cycle. Notably, only PEKK polymers having a phosphorus content above 30 ppm retain properties after heating which make them suitable for recycling.

The present invention is thus directed to the use of, at least partially recycled, powdered polymeric material (M) comprising PEKK a phosphorus content of more than 30 ppm, for manufacturing a 3D object.

The powdered polymer material (M) described herein is not significantly affected by the long-term exposure to the processing temperature and presents a set of characteristics which is comparable to a new, unprocessed polymer material. This makes the used powder completely suitable for reuse in additive manufacturing, for example a laser sintering 3D printing process, without impacting the appearance and mechanical performances of the resulting printed article (notably the expected performance of the polymer materials, e.g. the tensile properties of the PEKK).

Additionally, the powdered polymer material (M) exhibits an inherent processing window whereby critical mechanical properties, once the material is laser sintered via the process of the present invention into the resulting printed article, remain stable. These critical mechanical properties remain stable despite the ability to shift printing parameters to beneficially affect other attributes of the printed article.

In the process of the present invention, the powdered polymer material (M) is preferably heated, for example in the powder bed of a SLS printer, prior to the sintering of a selected area of the powder layer (for example, by means of an electromagnetic radiation of the powder), at a processing temperature (Tp) which typically ranges between 260 and 320° C., preferably at a temperature Tp which is inferior to Tm-5, where Tm is the melting temperature (Tm in ° C.) of the PEKK polymer in 1st heat DSC scan. It has been advantageously noticed that the polymeric powder material of the invention can not only be recycled but that it can also be heated at the same temperature, for example in the powder bed of a SLS printer, prior to the sintering, over several recycles. In other words, there is no need to increase the temperature of the printer bed when recycled powdered material according to the invention is used.

SLS 3D printers are, for example, available from EOS Corporation under the trade name EOSINT® P.

In the present application:
  any description, even though described in relation to a specific embodiment, is applicable to and interchangeable with other embodiments of the present invention;
  where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list; and
  any recitation herein of numerical ranges by endpoints includes all numbers subsumed within the recited ranges as well as the endpoints of the range and equivalents.

Powdered Polymer Material (M)

The powdered polymer material (M) employed in the method of the present invention comprises at least on PEKK polymer, as detailed below.

The powdered polymer material (M) of the present invention may further comprise a flow agent, also called sometimes flow aid. This flow agent may for example be hydrophilic. Examples of hydrophilic flow aids are inorganic pigments notably selected from the group consisting of silicas, aluminas and titanium oxide. Mention can be made of fumed silica.

Fumed silicas are commercially available under the trade name Aerosil® (Evonik) and Cab-O-Sil® (Cabot).

According to an embodiment of the present invention, the powdered polymer material (M) comprises from 0.01 to 10 wt. %, preferably from 0.05 to 5 wt. %, more preferably from 0.25 to 1 wt. % of a flow agent, for example of fumed silica.

These silicas are composed of nanometric primary particles (typically between 5 and 50 nm for fumed silicas). These primary particles are combined to form aggregates. In use as flow agent, silicas are found in various forms (elementary particles and aggregates).

The powdered polymer material (M) of the present invention may further comprise one or several additives, such as lubricants, heat stabilizers, light stabilizers, antioxidants, pigments, processing aids, dyes, fillers, nanofillers or electomagnetic absorbers. Examples of these optional additives are titanium dioxide, zinc oxide, cerium oxide, silica or zinc sulphide, glass fibers, carbon fibers.

The powdered polymer material (M) of the present invention may further comprise flame retardants such as halogen and halogen free flame retardants.

In some embodiments, the powdered polymer material (M) of the present invention consists essentially in PEKK polymer, preferably in recycled PEKK polymer.

Poly(Ether Ketone Ketone) (PEKK)

The PEKK polymer employed here is such that it has a phosphorus content of more than 30 ppm, preferably more than 50 ppm, more preferably more than 100 ppm, most preferably more than 200 ppm or even more preferably more than 300 ppm, as measured by Inductively Coupled Plasma Optical Emission Spectrometry (ICP-OES).

The PEKK polymer preferably has a phosphorus content of less than 3000 ppm, preferably less than 2000 ppm, more preferably less than 1000 ppm, as measured by Inductively Coupled Plasma Optical Emission Spectrometry (ICP-OES).

The PEKK described herein comprises at least one recurring unit ($R^M$) and at least one recurring unit ($R^P$), wherein recurring unit ($R^M$) is represented by formula (M):

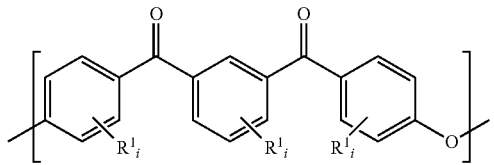

and recurring unit ($R^P$) is represented by formula (P):

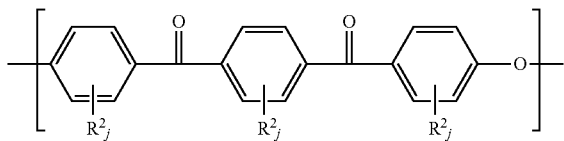

wherein:
 each $R^1$ and $R^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and
 each i and j, at each instance, is an independently selected integers ranging from 0 to 4.

According to an embodiment, $R^1$ and $R^2$ are, at each location in formulas (M) and (P) above, independently selected from the group consisting of a C1-C12 moiety optionally comprising one or more than one heteroatoms; sulfonic acid and sulfonate groups; phosphonic acid and phosphonate groups; amine and quaternary ammonium groups.

According to another embodiment, i and j are zero for each $R^1$ and $R^2$ group. In other words, recurring units ($R^P$) and ($R^M$) are both unsubstituted. According to this embodiment, recurring units ($R^M$) and ($R^P$) are respectively represented by formulas (M') and (P'):

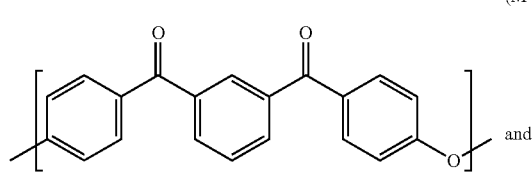

and

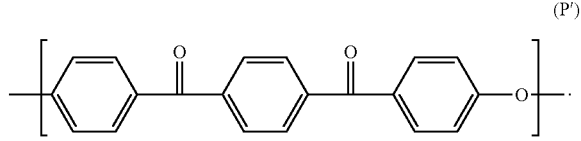

According to another embodiment, the PEKK polymer comprises at least one recurring unit ($R^M$), at least one recurring unit ($R^P$), and at least 50 mol. % of recurring units ($R^P$) and ($R^M$) of formulas (M), (P), (M') and/or (P'), the mol. % being based on the total number of moles in the polymer.

According to an embodiment of the present disclosure, at least 55 mol. %, at least 60 mol. %, at least 70 mol. %, at least 80 mol. %, at least 90 mol. %, at least 95 mol. %, at least 99 mol. % or all of the recurring units in the PEKK are recurring units ($R^P$) and ($R^M$) of formulas (M), (P), (M') and/or (P'), the mol. % being based on the total number of moles in the polymer.

The PEKK preferably has a ratio of recurring units ($R^P$)/($R^M$) ranging from 50/50 to 70/30, more preferably from 53/47 to 67/33 or from 55/45 to 65/35.

The PEKK may have one or two melting temperatures, Tm (° C.). Melting temperatures are measured on the $1^{st}$ heat scan by differential scanning calorimetry (DSC) according to ASTM D3418. For sake of clarity, when reference is made, in the present application, to the melting temperature of the PEKK polymer, reference is in fact made to the highest Tm in case the PEKK has two Tm temperatures.

In an embodiment of the invention, the powdered polymer material (M) of the invention presents a low volatiles content, which makes it well-suited for applications such as the manufacture of 3D objects using a laser-sintering based additive manufacturing system in which the powder has to stay at a high temperature in the powder bed for a long period of time. The volatiles content is defined as the amount of volatiles present in the powder of the invention before use. This amount should be as low as possible in order to limit the off-gazing, that is to say the gradual release of these volatiles when using the powder. Off-gazing can for example take place notably when heating the powder in the powder bed of an SLS printer, such heating sometimes taking several hours, prior to the sintering of the powder.

The volatiles content in the powder of the invention is hereby assessed using thermogravimetry (TGA) according to ASTM D3850 method. The temperature Td, at which a determined amount of volatile materials (e.g. 1 wt. % or 2 wt. %) leave the sample, is determined by heating progressively the sample from 30° C. to 800° C. under nitrogen using a heating rate of 10° C./min. The temperature Td(1%) is also called the thermal decomposition temperature at 1 wt. %. According to the present invention, Td(1%) should be as high as possible in order to limit the amount of volatiles generated when heating the powder in the powder bed of the SLS printer.

In an embodiment of the invention, the PEKK polymer has a Td(1%) of at least 500° C., preferably at least 505° C., more preferably at least 510° C., as measured by thermal gravimetric analysis according to ASTM D3850, heating from 30° C. to 800° C. under nitrogen using a heating rate of 10° C./min. This means that the powder retains 99 wt. % or more of its initial weight after being heated to a temperature of 500° C. or above, when measured in accordance with ASTM D3850, heating from 30° C. to 800° C. under nitrogen using a heating rate of 10° C./min.

In an embodiment of the invention, the PEKK polymer has a Td(1%) of less than 800° C., preferably less than 700° C., as measured by thermal gravimetric analysis according to ASTM D3850, heating from 30° C. to 800° C. under nitrogen using a heating rate of 10° C./min.

Synthesis of PEKK Polymers

The synthesis of PEKK polymers is described in the literature and typically comprises a step of polycondensing the monomers in a solvent, in order to obtain the PEKK polymer, and a step of extracting the solvent and the salts.

In a preferred embodiment of the present invention, the polycondensation of the monomers takes place in the absence of a Lewis acid or takes place in the presence of an amount of Lewis acid of less than 2 wt. %, based on the total weight of the monomers, preferably less than 1 wt. %, more preferably less than 0.5 wt. %.

In the context of the present invention, the Lewis acid may be defined as selected from the group consisting of $BF_3$, $AlCl_3$, $FeCl_3$, $CF_3SO_3H$ and $CH_3SO_3H$.

In a preferred embodiment, the synthesis of the PEKK polymer, comprises:

Step a) polycondensing in a solvent, in the absence of a Lewis acid or in the presence of an amount of Lewis acid of less than 2 wt. %, based on the total weight of the monomers, preferably less than 1 wt. %, more preferably less than 0.5 wt. %, the following monomers (P—OH), (M-OH), (P—F) and/or (M-F):

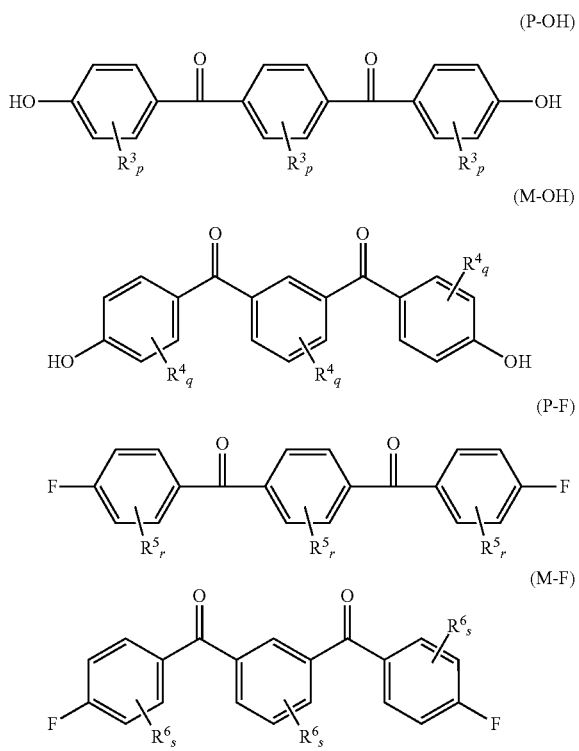

wherein
$R^3$, $R^4$, $R^5$ and $R^6$, at each instance, are independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;

p, q, r and s, at each instance, are independently selected from 0 to 4; wherein the molar ratio of moles of (P—OH) and (M-OH) to moles of (P—F) and (M-F) is such that:

$$0.90 \leq \frac{n_{(P\text{-}OH)} + n_{(M\text{-}OH)}}{n_{(P\text{-}F)} + n_{(M\text{-}F)}} \leq 1.10$$

preferably the molar ratio is to $\geq$ to 0.985, to $\geq$ to 0.990 or $\geq$ to 0.995,
preferably the molar ratio is to $\leq$ to 1.015, $\leq$ to 1.010 or $\leq$ to 1.005, Step b) extracting the solvent and the salts, in order to obtain a powder.

The method described above produces a PEKK powder having a low volatiles content. According to an embodiment, the PEKK polymer has a Td(1%) of at least 500° C., preferably 505° C., more preferably 510° C., as measured by thermal gravimetric analysis according to ASTM D3850, heating from 30° C. to 800° C. under nitrogen using a heating rate of 10° C./min.

In an embodiment, $R^3$, $R^4$, $R^5$ and $R^6$ are, at each location in formulas (P—OH), (P—F), (M-OH) and (M-F) above, are independently selected from the group consisting of a C1-C12 moiety optionally comprising one or more than one heteroatoms; sulfonic acid and sulfonate groups; phosphonic acid and phosphonate groups; amine and quaternary ammonium groups.

As mentioned above, it was found that a powder material comprising PEKK polymer having a phosphorus content of more than 30 ppm makes possible the recycling of the unsintered material and its reuse in a new process for manufacturing 3D objects. The synthesis approach involves a step of contacting the PEKK, preferably washing the PEKK, with a solution of at least one of sodium dihydrogen phosphate ($NaH_2PO_4$), disodium hydrogen phosphate ($Na_2HPO_4$), potassium dihydrogen phosphate ($KH_2PO_4$) and dipotassium hydrogen phosphate ($K_2HPO_4$), or mixture thereof. Preferably, the PEKK is contacted (e.g. washed) with a solution, e.g. and aqueous solution, including both $NaH_2PO_4$ and $Na_2HPO_4$. The phosphate salts used of the solutions used hereby can for example be anhydrous, monohydrate, dihydrate or heptahydrate.

The PEKK of the present invention preferably has a phosphorus content of more than 30 ppm, which is obtained by a step of contacting (e.g. washing) the PEKK with a solution of alkali metal phosphate. Indeed, the inventors demonstrate that blending a PEKK polymer with an alkaline earth phosphate powder lead to a non-homogenous powder, that-is-to-say a PEKK powder with agglomerates of phosphate-rich phases which then lead to a decrease in mechanical performance of molded articles, in comparison to the same molded articles based on a PEKK powder having a phosphorus content obtained by a step of contacting (e.g. washing) the PEKK with a solution of alkali metal phosphate.

The concentration of the $NaH_2PO_4$ in the solution is not particularly limited, but should be sufficient in order for the PEKK polymer to present a phosphorus content of more than 30 ppm. The amount of $NaH_2PO_4$ in the solution is preferably chosen to match the expected minimal 30 ppm amount of phosphorus atoms attached to the PEKK polymer. The concentration of $NaH_2PO_4$ in the solution is preferably at least 0.01 wt. %, more preferably at least 0.03 wt. %, most preferably at least 0.05 wt. %, most preferably at least 0.10 wt. %. The concentration of $NaH_2PO_4$ in the solution is preferably at most 0.35 wt. %, more preferably at most 0.30 wt. %, most preferably at most 0.25 wt. %, most preferably at most 0.20 wt. %. The concentration of $Na_2HPO_4$ in the solution is preferably at least 0.01 wt. %, more preferably at least 0.03 wt. %, most preferably at least 0.05 wt. %, most preferably at least 0.10 wt. %. The concentration of $Na_2HPO_4$ in the solution is preferably at most 0.35 wt. %, more preferably at most 0.30 wt. %, most preferably at most 0.25 wt. %, most preferably at most 0.20 wt. %.

As used herein, "washing" a PEKK polymer with a solution including at with a solution of at least one of sodium dihydrogen phosphate ($NaH_2PO_4$), disodium hydrogen phosphate ($Na_2HPO_4$), potassium dihydrogen phosphate ($KH_2PO_4$) and dipotassium hydrogen phosphate ($K_2HPO_4$), or mixture thereof, means substantially fixing phosphate groups on the PEKK polymer. "Substantially fixing" means that the PEKK polymer retains a phosphorus content of more than 30 ppm, as determined by Inductively Coupled Plasma Optical Emission Spectrometry (ICP-OES), for example more than 50 ppm, more than 100 ppm, more than 200 ppm or more than 300 ppm.

In some embodiments, the PEKK polymer is contacted (e.g. washed) with the solution for a time ranging from 5 minutes to 5 hours, preferably from 10 minutes to 3 hours. Methods of contacting, e.g. washing, polymers are well known to those of skill in the art, and include, for example, slurrying the polymer with the solution including the acid or base, as defined below, and then filtering off the solution.

It should be noted that "washing" is distinct from "impregnation" or the like, where a polymer may be contacted with a solution and then the solvent removed to leave the solute in contact with the polymer. Similarly, "washing" is different from adding a stabilizer to the PEKK polymer, where the stabilizer remains in contact with the polymer indefinitely. Advantages of washing include, ease, reduced cost, and avoidance of possible undesirable effects of leaving acids or bases in contact with (or dispersed within) the PEKK polymers. Finally, "washing" is also distinct from hydrothermal treatments involving high temperatures (i.e. greater than 100° C.) or high pressures (i.e. greater than 80 psig). In this regard, the washing is preferably performed at atmospheric pressure or at pressure of at most 80 psig. The washing is preferably carried out at a temperature ranging from 0 to 100° C.

Although the time at which the washing is performed is not particularly limited, preferably the washing is performed as part of the overall polymer synthesis, preferably as a final step in the synthesis of the PEKK polymer.

In some embodiments, the washing consists of a single washing step; however, it should be understood that the washing can also include a combination of more than one washing step, for example, with different acids, bases, or solvents in each step, provided that the combination of the washing steps achieves the above explained results of minimal phosphorus content attached to the PEKK polymer.

According to an embodiment of the present invention, the PEKK has a residual acidity ≤9 µeq/g, preferably 8 µeq/g, more preferably 6 µeq/g, as measured by the Residual Acidity Test.

According to an embodiment of the present invention, the PEKK has a residual acidity >0 µeq/g, preferably >1 µeq/g, as measured by the Residual Acidity Test.

According to another embodiment of the present invention, the PEKK has a residual basicity ≤20 µeq/g, preferably 17 µeq/g, more preferably 15 µeq/g, as measured by the Residual Basicity Test.

According to another embodiment of the present invention, the PEKK has a residual basicity >0 µeq/g, preferably >1 µeq/g, as measured by the Residual Basicity Test.

As used herein, the "Residual Acidity Test" and "Residual Basicity Test" refer to the titration analyses in m-cresol described in details in the Examples below.

In addition to the step of contacting the PEKK polymer with a solution of at least one of sodium dihydrogen phosphate ($NaH_2PO_4$), disodium hydrogen phosphate ($Na_2HPO_4$), potassium dihydrogen phosphate ($KH_2PO_4$) and dipotassium hydrogen phosphate ($K_2HPO_4$), or mixture thereof, the synthesis approach may also involve at least one step of contacting the PEKK, preferably washing the PEKK, with a solution including an acid or base in an amount sufficient to neutralize the PEKK polymer.

Suitable acids and bases include any organic or inorganic acid or base that exhibits a solubility of at least 0.1 wt. % in organic solvents such as alcohols, ketones, amides, aromatic hydrocarbons or in water at temperatures below the boiling point of the solvent. Preferably, the solvent has a boiling point of at most 250° C., more preferably at most 150° C. and most preferably at most 100° C. The acids preferably have a $pK_a$ ranging from 3.0 to 7.5, and the bases preferably have a $pK_b$ ranging from −1.0 to 8.0.

In some embodiments, the acid is selected from acetic acid, mono alkali metal citrates and combinations thereof.

In some embodiments, the base is selected from organic amines, tetraalkylammonium hydroxide, tetraalkylammonium acetate, tetraalkylphosphonium hydroxide, tetraalkylphosphonium acetate, alkali or alkaline earth metal hydroxides, alkali or alkaline earth metal monohydrogenphosphates, alkali or alkaline earth metal phosphates, and combinations thereof.

The preferred solvent is water, alcohol, ether, or ketones with boiling point of at most 150° C.; however, any solvent capable of dissolving at least 0.1 wt. % of the acid or base, and which does not adversely react with the PEKK polymer, may be used. Preferably the solvent is water, methanol, ethanol, propanol, or isopropanol. More preferably the solvent is water, methanol, or ethanol. In some embodiments, more than one solvent can be used.

The PEKK polymer is washed in the form of a powder. To ensure optimal contact with the washing solution, the mean particle size $d_{50}$-value of the PEKK polymer during the washing preferably ranges from 50 µm to 2 mm, more preferably from 200 µm to 1 mm. The PEKK polymer powder may have a BET surface area greater than 0.5 $m^2/g$, preferably greater than 1.0 $m^2/g$, most preferably greater than 2.5 $m^2/g$ as measured by ISO 9277 with a soak temperature of 25° C.

Grinding

The method for the production of a powdered polymer material (M) typically comprises a step of grinding the PEKK polymer or blended formulation, for example in the form of powder or pellets, in order to obtain a powdered polymer material (M) having for example a $d_{50}$-value ranging from 25 from 90 µm, for example from 35 to 88 µm, or from 45 to 85 µm, as measured by laser scattering in isopropanol. The $d_{50}$, also called D50, is known as the median diameter or the medium value of the particle size distribution, it is the value of the particle diameter at 50% in the cumulative distribution. It means that 50% of the particles in the sample are larger than the $d_{0.5}$-value, and 50% of the particles in the sample are smaller than the $d_{50}$-value. D50 is usually used to represent the particle size of group of particles.

The powder or pellets of blended formulations can for example be ground in a pinned disk mill, a jet mill/fluidized jet mil with classifier, an impact mill plus classifier, a pin/pin-beater mill or a wet grinding mill, or a combination of these equipment.

The pellets of blended formulations can be cooled before grinding to a temperature below the temperature at which the material becomes brittle, for example below 25° C. before being ground.

The step of grinding can also take place with additional cooling. Cooling can take place by means of liquid nitrogen or dry ice.

The ground powder can be separated, preferably in an air separator or classifier, to obtain a predetermined fraction spectrum.

In an embodiment, the method for the production of a powdered polymer material (M) may further comprise, a step consisting in exposing the powder to a temperature (Ta) ranging from the glass transition temperature (Tg) of the PEKK polymer and the lower melting temperature (Tm) of the PEKK polymer, both Tg and Tm being measured using differential scanning calorimetry (DSC) according to ASTM D3418. The temperature Ta can be selected to be at least 20° C. above the Tg of the PEKK polymer, for example at least 30, 40 or 50° C. above the Tg of the PEKK polymer. The temperature Ta can be selected to be at least 5° C. below the Tm of the PEKK polymer, for example at least 10, 20 or 30° C. below the Tm of the PEKK polymer. The exposition of the powder to the temperature Ta can for example be by heat-treatment and can take place in an oven (static, continuous, batch, convection), fluid bed heaters. The exposition of the powder to the temperature Ta can alternatively be by irradiation with electromagnetic or particle radiation. The heat treatment can be conducted under air or under inert atmosphere. Preferably, the heat treatment is conducted under inert atmosphere, more preferably under an atmosphere containing less than 2% oxygen.

As explained above, it has been presently discovered that when the powder material to be used to manufacture a 3D object comprises a PEKK polymer having a phosphorus content of more than 30 ppm, the recycling of the unsintered material is possible. In some embodiments, the recycled powdered material (M) has a $\Delta MFI \leq 90\%$, preferably 80%, more preferably 75%,
wherein:

$$\Delta MFI = 100(MFI_{t0} - MFI_{t1})/MFI_{t0}$$

wherein:
MFI is the Melt Flow Index as measured by ASTM D1238 at 340° C. with a 8.4 kg weight,
$MFI_{t0}$ is the MFI before a 744-hour exposure to a temperature of 260° C.,
$MFI_{t1}$ is the MFI after a 744-hour exposure to a temperature of 260° C.

In some embodiments, the powdered material (M) has a $d_{50}$-value comprised between 30 and 80 μm, preferably 35 and 70 μm, more preferably 40 and 60 μm, as measured by laser scattering in isopropanol.

In some embodiments, the powdered material (M) has a BET surface area ranging from 0.1 to 5 m²/g, preferably from 0.2 to 4 m²/g, preferably 0.2 to 2 m²/g, more preferably 0.2 to 1 m²/g, as measured by ISO 9277, at a soak temperature of 25° C.

In some embodiments, the powdered material (M) has a bulk density $\rho_B$ of at least 0.30, preferably 0.35, more preferably 0.40.

Method for Making a Three-Dimensional (3D) Object

The additive manufacturing method for making a three-dimensional (3D) object of the present invention comprises:
a) depositing successive layers of a powdered material (M), at least partially recycled, comprising at least one poly(ether ketone ketone) (PEKK), having a phosphorus content of more than 30 ppm, preferably more than 50 ppm, more preferably more than 100 ppm, most preferably more than 200 ppm or even most preferably more than 300 ppm, as measured by Inductively Coupled Plasma Optical Emission Spectrometry (ICP-OES), and
b) selectively sintering each layer prior to deposition of the subsequent layer.

In some embodiments, the powdered polymer material (M) comprises a ratio of recycled powder/unrecycled powder ranging from 50/50 to 100/0, preferably 55/45 to 100/1, more preferably 60/40 to 100/1.

In some other embodiments, the powdered polymer material (M) consists essentially in recycled powder.

According to an embodiment, the step of sintering comprises selective sintering by means of a high power energy source, for example a high power laser source such as an electromagnetic beam source.

In some embodiments, the method for making a 3D object of the present invention additionally comprises steps a1) to a4) below:
a1) heating a powdered material (M), comprising at least one poly(ether ketone ketone) (PEKK), having a phosphorus content of more than 30 ppm, preferably more than 50 ppm, more preferably more than 100 ppm, most preferably more than 200 ppm or even most preferably more than 300 ppm, as measured by Inductively Coupled Plasma Optical Emission Spectrometry (ICP-OES), to a temperature Tp (° C.) comprised between 260 and 320° C., preferably a temperature Tp as follows:

$Tp<Tm-5$, more preferably $Tp<Tm-10$, even more preferably $Tp<Tm-15$, wherein Tm (° C.) is the melting temperature of the PEKK polymer, as measured on the 1st heat scan by differential scanning calorimetry (DSC) according to ASTM D3418,
a2) depositing successive layers of the heated powdered material (M),
a3) selectively sintering each layer prior to deposition of the subsequent layer, and
a4) removing heated, non-fused powdered material of step a1) and recycling it in a subsequent printing cycle.

In some embodiments, the AM method for making a 3D object of the present invention therefore comprises at least the following steps:
a1) heating a powdered material (M), comprising at least one poly(ether ketone ketone) (PEKK), having a phosphorus content of more than 30 ppm, as measured by ICP-OES, to a temperature Tp (° C.) comprised between 260 and 320° C.,
a2) depositing successive layers of the heated powdered material (M),
a3) selectively sintering each layer prior to deposition of the subsequent layer,
a4) removing the heated, non-fused powdered material of step a1), b1) heating powdered material (M), at least partially recycled from step a4), b2) depositing successive layers of the heated powdered material (M) of step b1), b3) selectively sintering each layer prior to deposition of the subsequent layer, b4) removing the heated, non-fused powdered material of step b1), and c) optionally repeating steps b1) to b4).

The 3D object/article/part may be built on substrate, for example a horizontal substrate and/or on a planar substrate. The substrate may be moveable in all directions, for example in the horizontal or vertical direction. During the 3D printing process, the substrate can, for example, be lowered, in order for the successive layer of unsintered polymeric material to be sintered on top of the former layer of sintered polymeric material.

According to an embodiment, the process further comprises a step consisting in producing a support structure. According to this embodiment, the 3D object/article/part is built upon the support structure and both the support structure and the 3D object/article/part are produced using the same AM method. The support structure may be useful in multiple situations. For example, the support structure may be useful in providing sufficient support to the printed or under-printing, 3D object/article/part, in order to avoid distortion of the shape 3D object/article/part, especially when this 3D object/article/part is not planar. This is particularly true when the temperature used to maintain the printed or under-printing, 3D object/article/part is below the re-solidification temperature of the powder.

The method of manufacture usually takes place using a printer. The printer may comprise a sintering chamber and a powder bed, both maintained at determined at specific temperatures.

The powder to be printed can be pre-heated to a processing temperature (Tp) ranging from 260° C. to 320° C., from 270° C. to 310° C. or from 280° C. to 300° C. In some embodiments, the process is such that the powdered material (M) is heated before step b) to a temperature Tp (° C.):

$$Tp<Tm-5,$$

preferably $Tp<Tm-10,$ more preferably $Tp<Tm-15,$ wherein Tm (° C.) is the melting temperature of the PEKK polymer, as measured on the 1st heat scan by differential scanning calorimetry (DSC) according to ASTM D3418. The preheating of the powder makes it easier for the laser to raise the temperature of the selected regions of layer of unfused powder to the melting point. The laser causes fusion of the powder only in locations specified by the input. Laser energy exposure is typically selected based on the polymer in use and to avoid polymer degradation.

According to the present invention, the powder is not significantly affected by the long-term exposure to the processing temperature and presents a set of characteristics which are comparable to a new, unprocessed polymer material. This makes the used powder completely suitable for reuse in a laser sintering 3D printing process, without impacting the appearance and mechanical performances of the resulting printed article (notably the expected performance of the polymer materials).

3D Objects and Articles

The 3D objects or articles obtainable by such method of manufacture using at least partially recycled powdered material (M) can then be used in a variety of final applications. Mention can be made in particular of implantable device, medical device, dental prostheses, brackets and complex shaped parts in the aerospace industry and under-the-hood parts in the automotive industry.

The 3D objects or articles obtainable by such method of manufacture using such at least partially recycled powdered material (M) advantageously present a crystallinity of at least 25%, preferably at least 28%, more preferably at least 30%, as measured by DSC on the 1st heat scan as detailed in the examples.

The 3D objects or articles obtainable by such method of manufacture using such at least partially recycled powdered material (M) advantageously present a density of at least 1.20, preferably at least 1.22, more preferably 1.24 and most preferably 1.26.

The 3D objects or articles obtainable by such method of manufacture using such at least partially recycled powdered material (M) advantageously present an average in-plane tensile strength at break of at least 10,000 ksi, preferably at least 10,500 ksi, as measured on Type V ASTM tensile specimens according to ASTM method D638 at 0.05 inch/minute room temperature (i.e. 23° C.) on 3 specimens.

Should the disclosure of any patents, patent applications, and publications which are incorporated herein by reference conflict with the description of the present application to the extent that it may render a term unclear, the present description shall take precedence.

EXAMPLES

The disclosure will be now described in more detail with reference to the following examples, whose purpose is merely illustrative and not intended to limit the scope of the disclosure.

Examples

Example 1. Heat Aging of Several PEKK Polymers

Raw Materials

Kepstan® 6002 PEKK was obtained from Arkema.

Diphenyl sulfone (polymer grade) was procured from Proviron (99.8% pure).

Sodium carbonate, light soda ash, was procured from Solvay S.A., France and dried before use. Its particle size was such that its $d_{90}$ was 130 µm.

Potassium carbonate with a $d_{90}$<45 µm was procured from Armand products and dried before use.

Lithium chloride (anhydrous powder) was procured from Acros.

$NaH_2PO_4 \cdot 2H_2O$ and $Na_2HPO_4$ were purchased from Sigma-Aldrich.

Cab-O-Sil® M-5 commercially available from Cabot

Preparation of Monomers 1,4-bis(4'-fluorobenzoyl)benzene (1,4-DFDK) and 1,3 bis (4'-fluorobenzoyl)benzene (1,3-DFDK) were prepared by Friedel-Crafts acylation of fluorobenzene according to Example 1 of U.S. Pat. No. 5,300,693 to Gilb et al. (filed Nov. 25, 1992 and incorporated herein by reference in its entirety). Some of the 1,4-DFDK was purified as described in U.S. Pat. No. 5,300,693 by recrystallization in chlorobenzene, and some of the 1,4-DFDK was purified by recrystallization in DMSO/ethanol. The 1,4-DFDK purified by recrystallization in DMSO/ethanol was used as the 1,4-

DFDK in the polymerization reactions to make PEKK described below, while 1,4-DFDK recrystallized in chlorobenzene was used as precursor for 1,4-bis(4'-hydroxybenzoyl)benzene (1,4-BHBB).

1,4-BHBB and 1,3-bis(4'-hydroxybenzoyl)benzene (1,3-BHBB) were produced by hydrolysis of the 1,4-DFDK, and 1,3-DFDK, respectively, following the procedure described in Example 1 of U.S. Pat. No. 5,250,738 to Hackenbruch et al. (filed Feb. 24, 1992 and incorporated herein by reference in its entirety). They were purified by recrystallization in DMF/ethanol.

Synthesis of nPEKK #1—No Lewis Acid

In a 500 mL 4-neck reaction flask fitted with a stirrer, a N2 inlet tube, a Claisen adapter with a thermocouple plunging in the reaction medium, and a Dean-Stark trap with a condenser and a dry ice trap were introduced 112.50 g of diphenyl sulfone, 33.390 g of 1,3-BHBB, 6.372 g of 1,4-BHBB and 41.172 g of 1,4-DFDK. The flask content was evacuated under vacuum and then filled with high purity nitrogen (containing less than 10 ppm O2). The reaction mixture was then placed under a constant nitrogen purge (60 mL/min). The reaction mixture was heated slowly to 270° C. At 270° C., 13.725 g of Na2CO3 and 0.086 g of K2CO3 was added via a powder dispenser to the reaction mixture over 60 minutes. At the end of the addition, the reaction mixture was heated to 320° C. at 1° C./minute. After 2 minutes at 320° C., 1.207 g of 1,4-DFDK were added to the reaction mixture while keeping a nitrogen purge on the reactor. After 5 minutes, 0.529 g of lithium chloride were added to the reaction mixture. 10 minutes later, another 0.402 g of 1,4-DFDK were added to the reactor and the reaction mixture was kept at temperature for 15 minutes. Another charge of 25 g of diphenyl sulfone was added to the reaction mixture, which was kept under agitation for 15 minutes. The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. 0.67 g of $NaH_2PO_4 \cdot 2H_2O$ and 0.62 g of $Na_2HPO_4$ were dissolved in 1200 mL DI water for the last wash. The powder was then removed from the reactor and dried at 120° C. under vacuum for 12 hours yielding 72 g of a yellow powder. The final PEKK polymer had a T/I ratio of 58/42.

Synthesis of nPEKK #2—No Lewis Acid

In a 500 mL 4-neck reaction flask fitted with a stirrer, a N2 inlet tube, a Claisen adapter with a thermocouple plunging in the reaction medium, and a Dean-Stark trap with a condenser and a dry ice trap were introduced 112.50 g of diphenyl sulfone, 31.800 g of 1,3-BHBB, 7.950 g of 1,4-BHBB and 40.810 g of 1,4-DFDK. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 220° C. At 220° C., 13.725 g of $Na_2CO_3$ and 0.121 g of $K_2CO_3$ was added via a powder dispenser to the reaction mixture over 60 minutes. At the end of the addition, the reaction mixture was heated to 320° C. at 1° C./minute. After 120 minutes at 320° C., 0.805 g of 1,4-DFDK were added to the reaction mixture while keeping a nitrogen purge on the reactor. After 5 minutes, 0.529 g of lithium chloride were added to the reaction mixture. 10 minutes later, another 0.402 g of 1,4-DFDK were added to the reactor and the reaction mixture was kept at temperature for 15 minutes.

The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. 1.34 g of $NaH_2PO_4 \cdot 2H_2O$ and 1.24 g of $Na_2HPO_4$ were dissolved in 1200 mL DI water for the last wash. The powder was then removed from the reactor and dried at 120° C. under vacuum for 12 hours yielding 72 g of a yellow powder. The final PEKK polymer had a T/I ratio of 60/40. The residual acidity and basicity and phosphorus content were determined on the final powder (table 1), as well as on CE1 material.

Analysis Methods

Determination of Melt Flow Index

The melt flow index was determined according to ASTM D1238 at 340° C. with a 3.8 kg weight. The final MFI for a 8.4 kg weight, shown in Table 2, was obtained by multiplying the value obtained by 2.35.

Determination of Elemental Impurities in Monomers and PEKK Polymers by ICP-OES

A clean, dry platinum crucible was placed onto an analytical balance, and the balance was zeroed. One half to three grams of monomer/polymer sample was weighed into a boat and its weight was recorded to 0.0001 g. The crucible with sample was placed in a muffle furnace (Thermo Scientific Thermolyne F6000 Programmable Furnace). The furnace was gradually heated to 525° C. and held at that temperature for 10 hours to dry ash the sample. Following ashing, the furnace was cooled down to room temperature, and the crucible was taken out of the furnace and placed in a fume hood. The ash was dissolved in diluted hydrochloric acid. The solution was transferred to a 25 mL volumetric flask, using a polyethylene pipette. The crucible was rinsed twice with approximately 5 mL of ultrapure water (R<18 MΩcm) and the washes were added to a volumetric flask to effect a quantitative transfer. Ultrapure water was added to total 25 mL in the flask. A stopper was put on the top of the flask and the contents were shaken well to mix.

ICP-OES analysis was performed using an inductively-coupled plasma emission spectrometer Perkin-Elmer Optima 8300 dual view. The spectrometer was calibrated using a set of NIST traceable multi-element mixed standards with analyte concentrations between 0.0 and 10.0 mg/L. A linear calibration curve was obtained in a range of concentrations with a correlation coefficient better than 0.9999 for each of 48 analytes. The standards were run before and after every ten samples to ensure instrument stability. The results were reported as an average of three replicates. The concentration of elemental impurities in the sample was calculated with the following equation:

$$A=(B*C)/(D)$$

wherein
  A=concentration of element in the sample in mg/kg (ppm)
  B=element in the solution analyzed by ICP-OES in mg/L
  C=volume of the solution analyzed by ICP-OES in mL
  D=sample weight in grams used in the procedure.

Determination of Residual Acidity (the "Residual Acidity Test")

0.15-0.20 g of PEKK sample was weighted into a titration vessel and dissolved in 8 mL of m-cresol. After dissolving, the sample was diluted with 8 mL of chloroform, 50 µL of 37 wt/vol % aqueous formaldehyde solution. The sample was then titrated potentiometrically with standard 0.1N KOH in methanol using a Metrohm autotitrator Titrando 809 with an 2 mL burette and Metrohm combined pH electrode (Solvotrode) with flexible ground-joint diaphragm, filled with 3M LiCl in ethanol. The titrator readings were plotted against the volume of titrant solution, and the end point was taken at the inflection in the titration curve. Blank solutions were run every time samples were run, and under the same conditions. The blank value was determined from the volume of titrant needed to achieve the same mV electrode potential as the sample titration endpoint potential.

Variables:
V_blank—average volume of titrant to reach equivalence points from blanks, in mL
V_sample—volume of titrant to reach equivalence points in from a sample, in mL
W—sample mass in grams
N—titrant normality Residual acidity equation:

$$\frac{(V\_sample - V\_blank) \times N \times 1000}{W} = \text{Residual acidity in } \frac{\mu eq}{g}$$

Determination of Residual Basicity (the "Residual Basicity Test")

0.10-0.15 g of PEKK sample was weighted into a titration vessel and dissolved in 24 mL of titration solvent (m-cresol). The sample was then titrated potentiometrically with standard 0.1N perchloric acid in glacial acetic acid using a Metrohm autotitrator Titrando 809 with 10 mL burette and a Metrohm combined pH electrode (Solvotrode) with flexible ground-joint diaphragm, filled with 3M LiCl in ethanol. The titrator readings were plotted against the volume of titrant solution, and the end point was taken at the inflection in the titration curve. Each sample (including a blank solution) was run in duplicate and the average of the two results was reported.

Variables:
V_blank—average volume of titrant to reach equivalence points from blanks, in mL
V_sample—volume of titrant to reach equivalence points from a sample, in mL
W—sample mass in grams
N—titrant normality Residual basicity equation:

$$\frac{(V\_sample - V\_blank) \times N \times 1000}{W} = \text{Residual acidity in } \frac{\mu eq}{g}$$

Determination of Tensile Properties

Type V tensile specimens were subjected to tensile testing according to ASTM method D638 at 0.05 inch/minute room temperature (i.e. 23° C.) on 3 specimens.

Determination of the Glass Transition Temperature and Melting Temperature

The glass transition temperature Tg (mid-point) and the melting temperature Tm were determined on the 2nd heat scan in differential scanning calorimeter (DSC) according to ASTM D3418-03, E1356-03, E793-06, E794-06. Details of the procedure as used in this invention are as follows: a TA Instruments DSC Q20 was used with nitrogen as carrier gas (99.998% purity, 50 mL/min). Temperature and heat flow calibrations were done using indium. Sample size was 5 to 7 mg. The weight was recorded ±0.01 mg. The heat cycles were:

1st heat cycle: 30.00° C. to 400.00° C. at 20.00° C./min, isothermal at 400.00° C. for 1 min;
1st cool cycle: 400.00° C. to 30.00° C. at 20.00° C./min, isothermal for 1 min;
2nd heat cycle: 30.00° C. to 400.00° C. at 20.00° C./min, isothermal at 400.00° C. for 1 min.

The melting temperature Tm was determined as the peak temperature of the melting endotherm on the 1st or 2nd heat scan. The heat scan ($1^{st}$ or $2^{nd}$) used is indicated in the results. In case the polymer has two melting temperatures, only the highest is presented.

Determination of the Level of Crystallinity of Molded or Printed Specimens

The degree of crystallinity of a molded or printed specimen is determined by measuring its enthalpy of fusion. The enthalpy of fusion is determined as the area under the melting endotherm minus the area under any melting exotherm on the 1st heat scan in the differential scanning calorimeter (DSC) according to ASTM D3418-03, E1356-03, E793-06, E794-06 and using heating and cooling rates of 20° C./min. It is taken as the area over a linear baseline drawn from above the Tg to a temperature above the end of the endotherm. The degree of crystallinity is calculated by considering that 100% crystallinity corresponds to 130 J/g.

Characterization of the PEKK Polymers

TABLE 1 residual acidity, basicity, P in PEKK materials

| Material | Residual acidity (µeq/g) | Residual basicity (µeq/g) | [P] (ppm) | Tm $1^{st}$ heat (° C.) |
|---|---|---|---|---|
| Kepstan ® 6002 PEKK (comparative) | 10 | 12 | <0.32 | 303 |
| nPEKK #1 (inventive) | 4 | 12 | 310 | 286 |
| nPEKK #2 (inventive) | nd | nd | 606 | 294 |

Heat Aging of PEKK Powder

Powder samples for heat aging (n-PEKK #1) were ground using a Restch® Ultracentrifugal mill ZM200 grinder using a 1 mm screen, to ensure homogeneous particle size for the exposure testing.

75 g of Kepstan® 6002 PEKK (comparative) and nPEKK #1 (inventive) were weighed up in aluminum loaf pans and the pans placed in an oven under air at 260° C., with fan for 744 hours. This aging test was aimed at evaluating the stability of the powder upon multiple recycling in an SLS process where the powder is kept at temperature close to its melting point under concentrations of oxygen around 0.5-2.0%. The Melt flow, thermal transitions and tensile properties were measured on the samples before and after aging. The results are detailed in tables 2 and 3.

TABLE 2 heat aging MFI data

| Material | | MFI (g/10 min) | ΔMFI |
|---|---|---|---|
| Kepstan ® 6002 PEKK (comparative) | Unaged | 37.9 | ≈100% |
| | Aged | <1 (no flow) | |
| nPEKK #1 (inventive) | Unaged | 42.3 | 70.7% |
| | Aged | 12.4 | |

Creation of Tensile Specimens

Tensile specimens for heat aging were created using a compression molding process. A 762 mm×762 mm×3.2 mm plaque was prepared from the polymer by compression molding of 25 g of polymer under the following conditions:
preheat at 343° C.,
343° C./15 minutes, 2000 kg-f
343° C./2 minutes, 2700 kg-f
cool down to 30° C. over 40 minutes, 2000 kg-f The 762 mm×762 mm×3.2 mm compression molded plaques were machined into Type V ASTM tensile specimens.

Results

TABLE 3 heat aging data

| Material | | Tensile strength at yield (psi) | Elongation at break (%) | Tm 1st heat (° C.) | % crystallinity |
|---|---|---|---|---|---|
| Kepstan ® 6002 PEKK (comparative) | Unaged | 12,200 [57] | 65 [40] | 303 | 4 |
| | Aged | 12,500 [64] | 25 [19] | 302 | 1 |
| nPEKK#1 (inventive) | Unaged | 12,400 [81] | 59 [39] | 286 | 0 |
| | Aged | 12,300 [45] | 50 [15] | 287 | 0 |

The results from Table 2 and 3 indicates that the inventive nPEKK #1 powder is much more stable in the powder form at 260° C. under air than the material of the comparative example 1. The MFI change for example is less than 71%, while Kepstan® 6002 PEKK powder material was found to exhibit no flow at all after heat aging.

The inventive nPEKK #1 powder retained 85% of the elongation at break after aging, as compared to 38% to Kepstan® 6002 PEKK powder material.

Example 2. SLS Printing

Powder samples for SLS printing were ground in a Retsch SR300 rotor mill. A well-mixed blend of nPEKK #2 (one portion) and crushed dry ice (two portions) was slowly fed to the feed port of the Retsch mill, fitted with a 0.5 mm opening Conidur screen mounted in the reverse flow position and standard 6-blade rotor with a speed of 10,000 rpm.

The material was re-blended with crushed dry ice at 1 part resin and 2 parts dry ice to the Retsch SR300 with a 0.08 mm screen, also in the reverse flow position with a standard 6-blade rotor at 10,000 rpm.

Once all the material had been ground through the 0.08 mm grinding screen, it was vacuum oven dried at 120° C. for about 16 hours.

The powder was then mixed with 0.5 wt % of Cab-O-Sil® M-5 and heat treated in a rotary drum dryer (Grieves oven) at 280-285° C. under nitrogen for 4-6 h.

SLS Printing Process and Creation of Tensile Specimens

Tensile specimens via SLS printing were created using an EOS® P800 laser sintering printer. The powder was sintered into Type V ASTM tensile specimens using a laser power setting of 19 W, a processing temperature (Tp) of either 285° C. or 291° C., a print duration of less than 1.5 hours, and a cooling rate of less than 10° C./min.

Results

The results are detailed in tables 4 and 5.

TABLE 4

SLS recycle printing at a 100% refresh rate (100% by weight recycled powder) and at 291° C.

| Material | | Tm 1st heat (° C.) | Processing temperature (° C.) | Ultimate tensile strength (psi) | Elongation at break (%) |
|---|---|---|---|---|---|
| nPEKK #2 (inventive) | Fresh | 309 | 291 | 12,200 [1070] | 2.8 [0.48] |
| | Recycle 1 | 307 | 291 | 10,800 [924] | 2.6 [0.35] |
| | Recycle 2 | 308 | 291 | 11,400 [528] | 2.9 [0.29] |

This data shows mechanical results from tensile bars printed via SLS (with a process of 100% recycling of the unsintered powder). Due to the nature of SLS, the powder is subjected to another type of heat aging process, similar to that of Table 2. The data indicates that the PEKK #2 powder is stable. The material retained 93% of tensile strength and demonstrated no loss in elongation at break.

TABLE 5

SLS recycle printing at a 40% refresh rate (40% by weight fresh powder and 60% by weight recycled powder) and at 285° C.

| Material | | Processing temperature (° C.) | Ultimate tensile strength (ksi) | Elongation at break (%) |
|---|---|---|---|---|
| nPEKK#2 (inventive) | Fresh | 285 | 10,800 [1280] | 2.7 [0.43] |
| | Recycle 1 | 285 | 11,400 [307] | 3.0 [0.15] |
| | Recycle 2 | 285 | 10,800 [1060] | 2.6 [0.49] |
| | Recycle 3 | 285 | 11,100 [948] | 2.8 [0.41] |

Similarly, this data also details the mechanical results from the SLS process, with the exception that the recycled powder is being refreshed with 40% by weight fresh powder for every iteration. In this case, the powder demonstrates an even higher stability, with no loss of mechanical properties.

Example 3. Heat Aging of a Blend of PEKK and Magnesium Phosphate (Comparative)

Example 2 of CN 108606860 A was replicated to prepare a blend of PEKK with magnesium phosphate. Kepstan® 6002 PEKK was used.

The blend was characterized according to the methods described in example 1.

TABLE 6 residual acidity, basicity, P and Td (1%) in PEKK blend

| Material | Residual acidity (µeq/g) | Residual basicity (µeq/g) | [P] (ppm) | Td (1%) by TGA (° C.) |
|---|---|---|---|---|
| Kepstan ® 6002 PEKK + magnesium phosphate (comparative) | 5 | 0 | 6,838 | 303 |

TABLE 7 tensile properties on compression molded samples

| Material | Tensile strength at yield (psi) | Elongation at break (%) | Tensile strength at break (psi) | Tensile modulus (ksi) |
|---|---|---|---|---|
| Kepstan ® 6002 PEKK + magnesium phosphate (comparative) | 10,961 [976] | 4 [2] | 9,353 [1110] | 462 [21] |

The blend was then exposed to the following heat treatment conditions defined: 260° C. for 744 h under air. The melt flow index was measured before and after heat treatment. The results are shown in table 8. The blend described in CN108606860 is not stable under the heat treatment conditions (−100% change in MFI), indicating that the powder composites with magnesium phosphate do not exhibit the same stability as the PEKK of the present invention.

TABLE 8 heat aging results

| Material | | MFI (g/10 min) | ΔMFI |
|---|---|---|---|
| Kepstan ® 6002 PEKK + magnesium phosphate (comparative) | Unaged | 22 | 100% |
| | Aged | 0 | |

The invention claimed is:

1. A method for manufacturing a three-dimensional (3D) object, comprising:
   a) depositing successive layers of a powdered material (M), at least partially recycled, comprising at least one a poly (ether ketone ketone) (PEKK), wherein the at least one PEKK has a phosphorus content of more than 30 ppm, which is obtained by a step of contacting a PEKK powder with a solution of alkali metal phosphate, this phosphorus content being measured by Inductively Coupled Plasma Optical Emission Spectrometry (ICP-OES), wherein the alkali metal phosphate is at least one of sodium dihydrogen phosphate ($NaH_2PO_4$), disodium hydrogen phosphate ($Na_2HPO_4$), potassium dihydrogen phosphate ($KH_2PO_4$), dipotassium hydrogen phosphate ($K_2HPO_4$) or mixtures thereof, and
   b) selectively sintering each of the successive layers prior to deposition of a subsequent successive layer,
   wherein the at least one PEKK is a polymer comprising at least 95 mol % of a first recurring unit ($R^M$) and a second recurring unit ($R^P$), respectively represented by formulae (M') and (P'), the mol % being based on a total number of moles in the polymer:

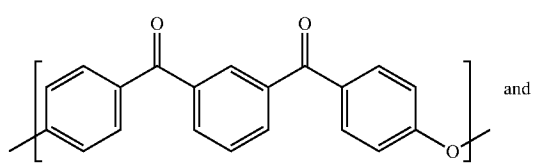
(M')

and

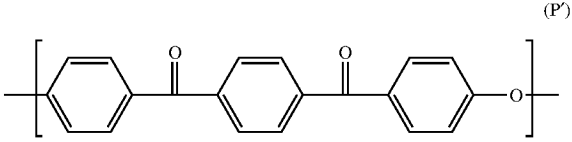
(P')

wherein the at least one PEKK has a residual acidity ≤9 μeq/g as measured by the Residual Acidity Test and a residual basicity ≤20 μeq/g as measured by the Residual Basicity Test;

and wherein the at least one PEKK is prepared by the synthesis method further comprising:
   i) polycondensing in a solvent, in the absence of a Lewis acid or in the presence of an amount of Lewis acid of less than 2 wt. %, based on the total weight of the monomers, the following monomers (P'—OH), (M'-OH), (P'—F) and/or (M'-F):

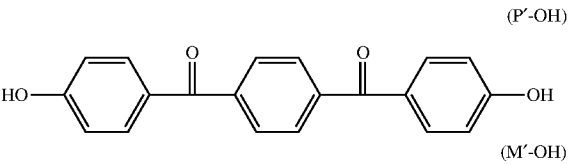
(P'-OH)

(M'-OH)

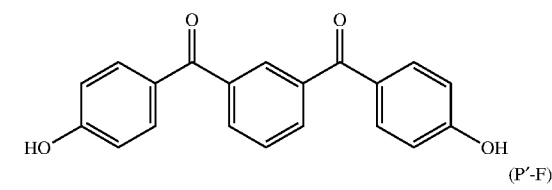
(P'-F)

(M'-F)

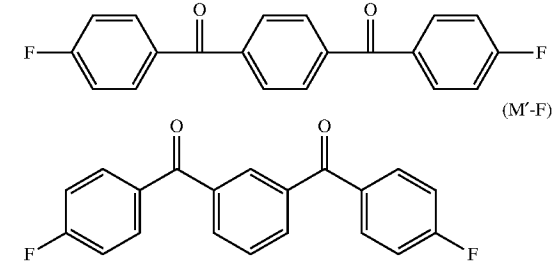

wherein the molar ratio of moles of (P'—OH) and (M'-OH) to moles of (P'—F) and (M'-F) is such that:

$$0.90 \leq \frac{n_{(P'-OH)} + n_{(M'-OH)}}{n_{(P'-F)} + n_{(M'-F)}} \leq 1.10, \text{ and}$$

ii) extracting the solvent and salts, in order to obtain the PEKK powder.

2. The method of claim 1, wherein the at least one PEKK has a Td(1%) of at least 500° C., as measured by thermal gravimetric analysis according to ASTM D3850, heating from 30° C. to 800° C. under nitrogen using a heating rate of 10° C./min.

3. The method of claim 1, wherein the PEKK has a ratio of the second recurring unit over the first recurring unit ($R^P$)/($R^M$) ranging from 50/50 to 70/30.

4. The method of claim 1, wherein the recycled powdered material (M) has a ΔMFI≤90% wherein:

$$\Delta MFI = 100(MFI_{r,0} - MFI_{r,1})/MFI_{r,0}$$

wherein:
MFI is the Melt Flow Index as measured by ASTM D1238 at 340° C. with a 8.4 kg weight,
$MFI_{r0}$ is the MFI before a 744-hour exposure to a temperature of 260° C.,
$MFI_{r1}$ is the MFI after a 744-hour exposure to a temperature of 260° C.

5. The method of claim 1, wherein the powdered material (M) has a $d_{50}$-value from 30 to 80 μm, as measured by laser scattering in isopropanol.

6. The method of claim 1, wherein the at least one PEKK is obtained by the synthesis method further comprising:
iii) grinding the PEKK powder, and
iv) exposing the ground PEKK powder to a temperature (Ta) ranging from a glass transition temperature (Tg) of the at least one PEKK to a melting temperature (Tm) of the at least one PEKK, both Tg and Tm being measured using differential scanning calorimetry (DSC) according to ASTM D3418.

7. The method of claim 1, wherein the powdered material (M) has a BET surface area ranging from 0.1 to 5 $m^2/g$, as measured by ISO 9277, at a soak temperature of 25° C.

8. The method of claim 1, wherein the powdered material (M) has a bulk density pp of at least 0.30.

9. The method of claim 1, wherein the powdered material (M) is heated before step b) to a temperature Tp (° C.):

$$Tp<Tm-5,$$

wherein Tm (° C.) is a melting temperature of the at least one PEKK, as measured on the $1^{st}$ heat scan by differential scanning calorimetry (DSC) according to ASTM D3418.

10. The method of claim 1, wherein the powdered material (M) comprises a ratio of recycled powder/unrecycled powder ranging from 50/50 to 100/0.

* * * * *